United States Patent [19]

Ohta et al.

[11] Patent Number: 4,538,481
[45] Date of Patent: Sep. 3, 1985

[54] FIRST-ORDER BALANCER OF INTERNAL COMBUSTION ENGINE

[75] Inventors: Michio Ohta, Nara; Sakito Kamei, Sakai; Kazumi Aoki, Nara, all of Japan

[73] Assignee: Hitachi Shipbuilding & Engineering Co., Ltd., Japan

[21] Appl. No.: 632,265

[22] Filed: Jul. 19, 1984

Related U.S. Application Data

[63] Continuation of Ser. No. 377,560, May 12, 1982, abandoned.

[51] Int. Cl.³ .............................................. F16C 3/06
[52] U.S. Cl. ..................................... 74/603; 123/192 B
[58] Field of Search ............. 74/603, 604; 123/192 R, 123/192 B

[56] References Cited

U.S. PATENT DOCUMENTS

| | | | |
|---|---|---|---|
| 2,154,359 | 4/1939 | Sarazan | 74/603 |
| 2,182,988 | 12/1939 | Iseler | 74/604 |
| 2,632,340 | 3/1953 | Dolza et al. | 74/603 |
| 3,203,274 | 8/1965 | Barth et al. | 74/604 |

FOREIGN PATENT DOCUMENTS

| | | | |
|---|---|---|---|
| 165220 | 12/1953 | Australia | 74/603 |
| 2822589 | 11/1979 | Fed. Rep. of Germany | 74/603 |
| 149643 | 9/1982 | Japan | 74/603 |
| 648765 | 3/1979 | U.S.S.R. | 74/603 |

*Primary Examiner*—Kenneth J. Dorner
*Attorney, Agent, or Firm*—Darby & Darby

[57] ABSTRACT

The present application discloses a first-order balancer of an internal combustion engine comprising forward-rotating fly-wheels fitted on both ends of a shaft and allowed to rotate in the same direction as said shaft, backward-rotating fly-wheels fitted respectively on said both forward-rotating fly-wheels and allowed to rotate in the opposite direction from said both forward-rotating fly-wheels, forward-rotational counterweights placed on said both forward-rotating fly-wheels, and backward-rotational counterweights placed on said both backward-rotating fly-wheels and having a different weight from said both forward-rotational counterweights. According to the first-order balancer of an internal combustion engine of the present invention, vertical and horizontal first-order unbalanced moments arising in an internal combustion engine may be simultaneously balanced.

1 Claim, 10 Drawing Figures

FIG.1(a)
FIG.1(b)
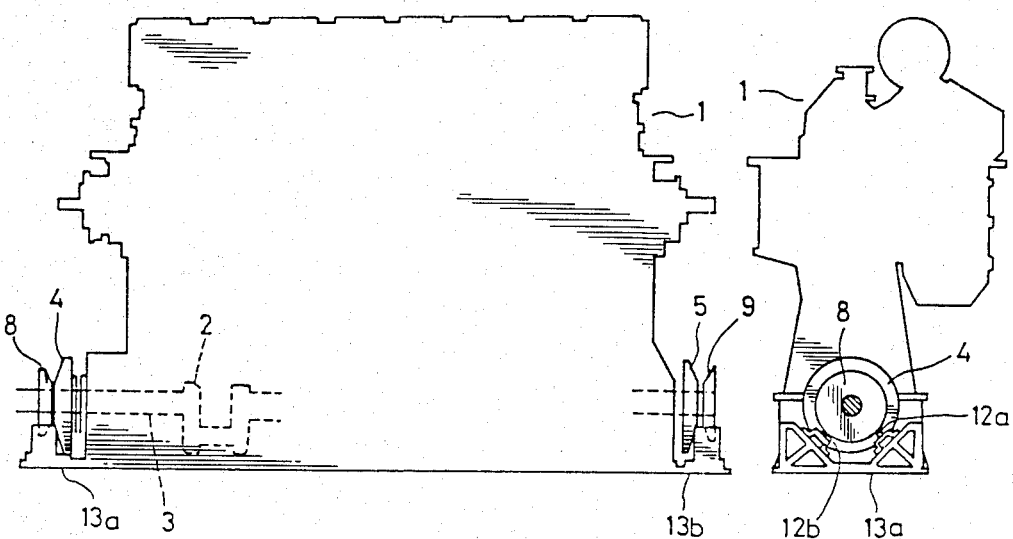
Fig.2
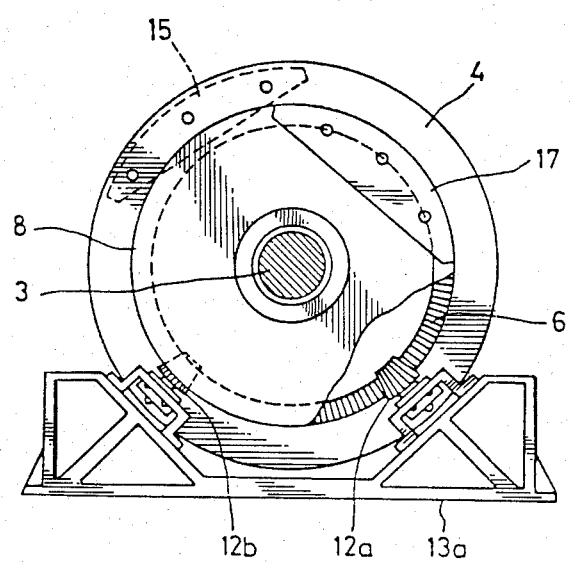

FIRST-ORDER BALANCER OF INTERNAL COMBUSTION ENGINE

This is a continuation of application Ser. No. 377,560, filed May 12, 1982, and now abandoned.

FIELD OF INVENTION

The present invention relates to a first-order balancer of an internal combustion engine by which vertical and horizontal first-order unbalanced moments arising in an internal combustion engine may be simultaneously balanced.

BACKGROUND OF THE INVENTION

Generally in internal combustion engines, in a four-cylinder diesel engine for example, vertical and horizontal first-order unbalanced moments arise during the driving thereof. Such first-order unbalanced moments have been conventionally balanced by fitting fly-wheels with counterweights placed thereon on the front and rear ends of a shaft of a diesel engine, and allowing the fly-wheels to rotate with the rotation of the shaft.

In the above-mentioned case, however, the sum of the vertical first-order unbalanced moment and the horizontal first-order unbalanced moment is maintained at a constant relationship, and when one of the first-order unbalanced moment is reduced by the compensation thereof, the other first-order unbalanced moment is increased thereby, causing an inconvenience that both vertical and horizontal moments may not be simultaneously balanced.

While chain-balancers or electric balancers have been conventionally used to balance the vertical second-order unbalanced moment and to decrease the vibrating force of one direction, namely the vertical direction, if chain-balancers or electric balancers are applied for balancing vertical and horizontal first-order unbalanced moments, the counterweights or the balancers become too big to be loaded on diesel engines of vessels and so on.

DISCLOSURE OF THE INVENTION

A first-order balancer of an internal combustion engine in accordance with the present invention comprises forward-rotating fly-wheels fitted on both ends of a shaft and allowed to rotate in the same direction as said shaft, backward-rotating fly-wheels fitted respectively on said both forward-rotating fly-wheels and allowed to rotate in the opposite direction from said both forward-rotating fly-wheels, forward-rotational counterweights placed on said both forward-rotating fly-wheels, and backward-rotational counterweights placed on said both backward-rotating fly-wheels and having different weights from said both forward-rotational counterweights.

BRIEF DESCRIPTION OF THE DRAWINGS

The present invention will be further described by way of example, with reference to the accompanying drawings, in which:

FIGS. 1a and 1b are front and side views of a first embodiment of a first-order balancer of an internal combustion engine in accordance with the present invention;

FIG. 2 is an enlarged view of a portion in FIG. 1;

PREFERRED EMBODIMENTS OF THE PRESENT INVENTION

Figure 3:
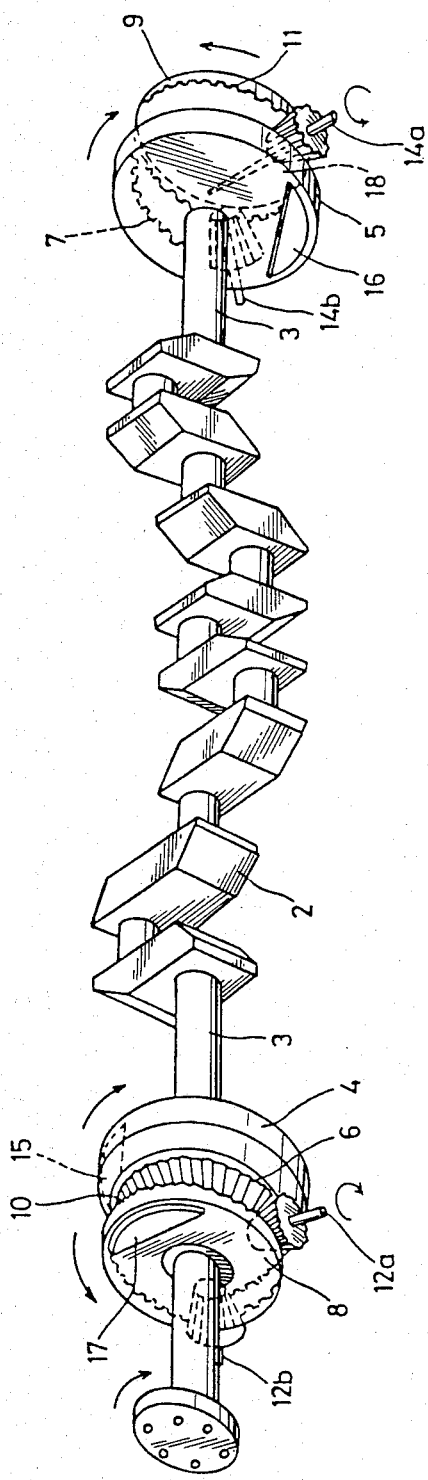
FIG. 3 is a perspective view of main portions in FIG. 1.

The description hereinafter will discuss a first embodiment of the present invention with reference to FIGS. 1 to 5.

A crank 2 is installed within a four-cylinder diesel engine 1. A shaft 3 rotates with the rotation of the crank 2. Two forward-rotating fly-wheels 4 and 5 are fitted on both ends of the shaft 3 and rotate in the same direction as the shaft 3. Two forward-rotating gears 6 and 7 are formed on the forward-rotating fly-wheels 4 and 5, respectively. Two backward-rotating fly-wheels 8 and 9 are fitted on the outer sides of forward-rotating fly-wheels 4 and 5, respectively, and two backward-rotating gears 10 and 11 are formed on the backward-rotating fly-wheels 8 and 9, respectively. Two bevel gears 12a and 12b are fitted between the forwarding-rotating gear 6 and the backward-rotating gear 10 at one end of the shaft, and allow the backward-rotating fly-wheel 8 to rotate in the opposite direction from the rotation of the forward-rotating fly-wheel 4. The bevel gears 12a and 12b are held on a mount 13a. Two bevel gears 14a and 14b are fitted between the forward-rotating gear 7 and the backward-rotating gear 11 at the other end of the shaft, and allow the backward-rotating fly-wheel 9 to rotate in the opposite direction from the rotation of the forward-rotating fly-wheel 5. The bevel gears 14a and 14b are held on a mount 13b, in a similar manner to the bevel gears 12a and 12b. Two forward-rotational counterweights 15 and 16 are placed on the forward-rotating fly-wheels 4 and 5, respectively, and two backward-rotational counterweights 17 and 18 are placed on the backward-rotating fly-wheels 8 and 9, respectively. The backward-rotational counterweights 17 and 18 have a different weight from the forward-rotational counterweights 15 and 16. It is to be noted that arrows shown in FIG. 3 indicate the respective directions of rotation.

Figure 4:
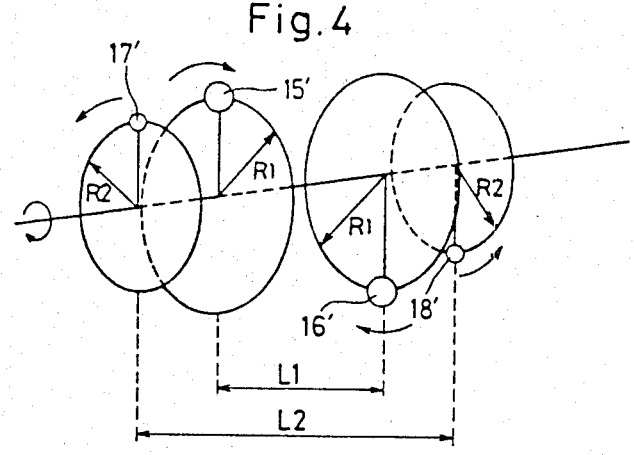
FIG. 4 is a balancing system of the first embodiment in FIG. 1.

As shown in FIG. 4, by substituting two forward-rotating masses 15' and 16' for the forward-rotational counterweights 15 and 16, respectively, and substituting two backward-rotating masses 17' and 18' for the backward-rotational counterweights 17 and 18, respectively, and by setting the distance from the center of the shaft 3 to each of the masses 15' and 16' as R1 and also setting the distance from the center of the shaft 3 to each of the masses 17' and 18' as R2, the coupling moments for both forward-rotating masses 15' and 16' and both backward-rotating masses 17' and 18', ma and mb, respectively, may be expressed in equations (1) and (2) hereinafter shown:

$$ma = (W/g) \cdot R1 \cdot \omega^2 \cdot L1 \quad (1)$$

$$mb = (w/g) \cdot R2 \cdot \omega^2 \cdot L2 \quad (2)$$

where W is the weight of the forward-rotational counterweights 15 and 16, w is the weight of the backward-rotational counterweights 17 and 18, $\omega$ is an angular velocity at which the shaft 3 rotates, L1 is the distance between two forward-rotating masses 15' and 16', and L2 is the distance between two backward-rotating masses 17' and 18'. The vertical first-order unbalanced moment to be compensated arises as ma+mb, while the horizontal first-order unbalanced moment for compensation arises as ma−mb.

In so-called uncompensated conditions, vertical and horizontal first-order unbalanced moments, Mva and Mha, respectively may be expressed in simple equations (3) and (4) hereinafter shown:

$$Mva = mv \cdot \cos(\theta + \epsilon) \quad (3)$$

$$Mha = mh \cdot \sin(\theta + \epsilon) \quad (4)$$

where mv and mh are vertical and horizontal maximum first-order unbalanced moments, respectively, $\theta$ is the rotational angle and $\epsilon$ is the initial phase.

Therefore, both first-order unbalanced moments Mva and Mha shown in equations (3) and (4) as being the vibrating moments in uncompensated conditions should be compensated by means of the forward-rotational counterweights 15 and 16 and the backward-rotational counterweights 17 and 18, and the both first-order unbalanced moments Mva and Mha in uncompensated conditions may be balanced out by said both first-order unbalanced moments for compensation so that both compensated vertical and horizontal first-order unbalanced moments Mvb and Mhb become zero.

Here the compensated vertical and horizontal first-order unbalanced moments Mvb and Mhb may be expressed in equations (5) and (6) hereinafter shown respectively:

$$Mvb = mv \cdot \cos(\theta + \epsilon) + mv' \cdot \cos(\theta + \gamma) = 0 \quad (5)$$

$$Mhb = mh \cdot \sin(\theta + \epsilon) + mh' \cdot \sin(\theta + \gamma) = 0 \quad (6)$$

where mv' and mh' are the maximum first-order unbalanced moments for compensation by means of the forward-rotational counterweights 15 and 16 and the backward-rotational counterweights 17 and 18, respectively, and $\gamma$ is the initial phase of said mv' and mh'.

Therefore, by adjusting the weight W of the forward-rotational counterweights 15 and 16, the weight w of the backward-rotational counterweights 17 and 18, and the placing positions of the counterweights 15, 16, 17 and 18 on the respective fly-wheels 4, 5, 8 and 9 so that the following equalities may be achieved:

$$mv' = ma + mb = \beta \cdot mo,$$

$$mh' = ma - mb = mo, \text{ and}$$

$$\epsilon = \gamma + 180°, \text{ where } \beta = mv'/mh',$$

equations (5) and (6) may be transformed to equations (7) and (8) hereinafter shown respectively:

$$\begin{aligned} Mvb &= mv \cdot \cos(\theta + \epsilon) + \beta \cdot mo \cdot \cos(\theta + \epsilon - 180°) \\ &= mv \cdot \cos(\theta + \epsilon) - \beta \cdot mo \cdot \cos(\theta + \epsilon) \end{aligned} \quad (7)$$

$$\begin{aligned} Mhb &= mh \cdot \sin(\theta + \epsilon) + mo \cdot \sin(\theta + \epsilon - 180°) \\ &= mh \cdot \sin(\theta + \epsilon) - mo \cdot \sin(\theta + \epsilon) \end{aligned} \quad (8)$$

Furthermore, from the fact that equations (7) and (8) always become zero, equations (9) and (10) are derived:

$$mv = \beta \cdot mo = ma + mb \quad (9)$$

$$mh = mo = ma - mb \quad (10)$$

From equations (9) and (10), equations (11) and (12) are derived:

$$ma = (1 + \beta) \cdot mo \cdot (\tfrac{1}{2}) \quad (11)$$

$$mb = (1 - \beta) \cdot mo \cdot (\tfrac{1}{2}) \quad (12)$$

Figure 5A:
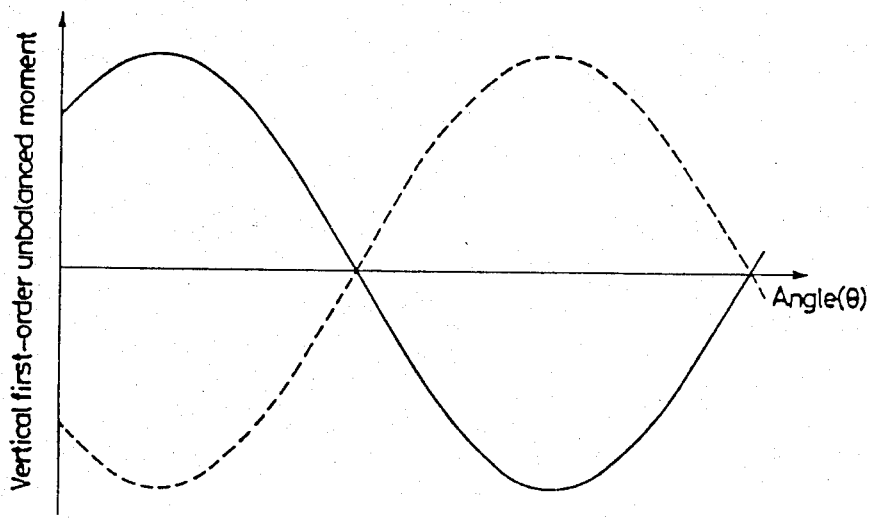
FIGS. 5a and 5b are compensation conditions of vertical and horizontal first-order unbalanced moments, respectively, in the first embodiment in FIG. 1.
Figure 5B:
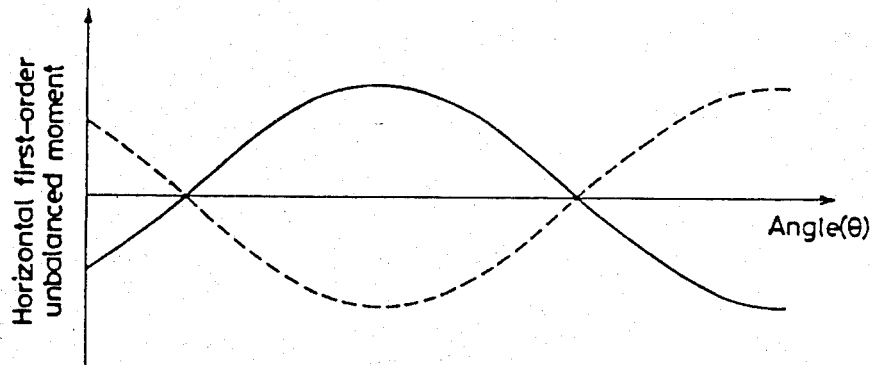

Against the vertical first-order unbalanced moment Mva arising in uncompensated conditions as shown by a solid line in FIG. 5a, a vertical first-order unbalanced moment for compensation as shown by a dotted line in FIG. 5a acts as a counteracting moment, and the vertical first-order unbalanced moment in uncompensated conditions is balanced out by the vertical first-order unbalanced moment for compensation to be zero. Similarly, against the horizontal first-order unbalanced moment arising in uncompensated conditions as shown by a solid line in FIG. 5b, a horizontal first-order unbalanced moment for compensation as shown by a dotted line in FIG. 5b acts as a counteracting moment, and the horizontal first-order unbalanced moment in uncompenstated conditions is balanced out by the horizontal first-order unbalanced moment for compensation to be zero.

Figure 6A:
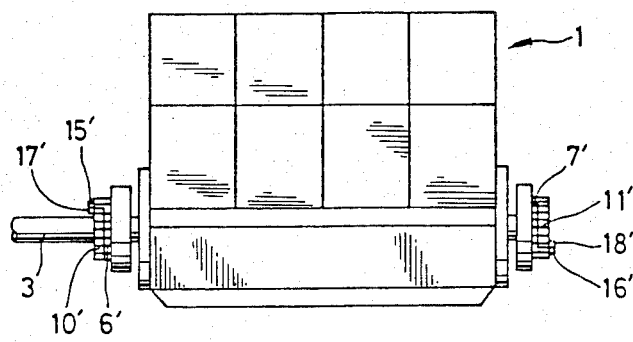
FIGS. 6a and 6b are front and plain views of a second embodiment of a first-order balancer of an internal combustion engine in accordance with the present invention.
Figure 6B:
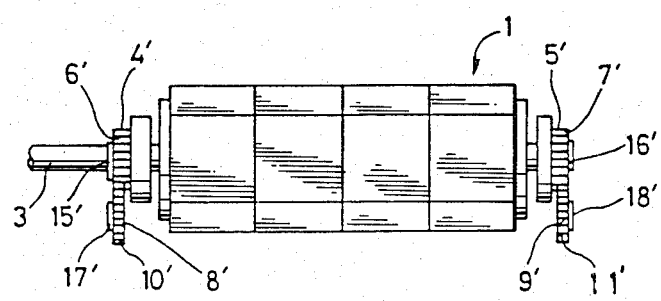
Figure 7:
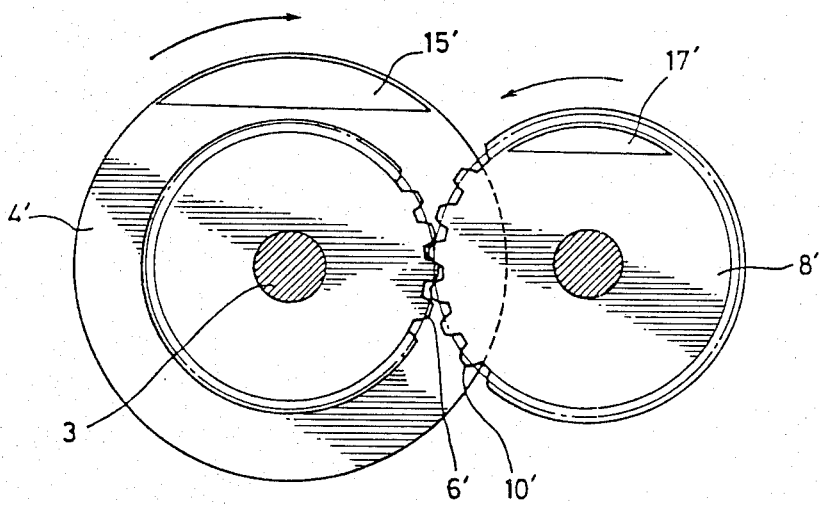
FIG. 7 is an enlarged side section view of a portion in FIG. 6.

The description hereinafter will discuss a second embodiment of the present invention with reference to FIGS. 6 and 7.

The second embodiment is different from the first embodiment shown in FIGS. 1 to 3 in that two forward-rotating fly-wheels 4' and 5' are fitted on both ends of the shaft 3 of an engine 1, forward-rotating gears 6' and 7' are formed on the forward-rotating fly-wheels 4' and 5', respectively, two backward-rotating fly-wheels 8' and 9' are fitted in parallel with the forward-rotating gears 6' and 7', backward-rotating gears 10' and 11' are formed on the backward-rotating fly-wheels 8' and 9' and engage with the forward-rotating gears 6' and 7', respectively, to rotate in the opposite direction from the rotation of the shaft 3, forward-rotational counterweights 15' and 16' with a weight of W are placed on the forward-rotating fly-wheels 4' and 5', respectively, and backward-rotational counterweights 17' and 18' with a weight of w are placed on the backward-rotating fly-wheels 8' and 9'. It is to be noted that arrows shown in FIG. 7 indicate the respective directions of rotation.

When the forward-rotating fly-wheels 4' and 5' rotate in the same direction as the rotation of the shaft 3, the backward-rotating fly-wheels 8' and 9' rotate in the opposite direction from the rotation of the shaft 3 and the vertical and horizontal first-order unbalanced moments arising in uncompensated conditions are simultaneously balanced out by the vertical and horizontal first-order unbalanced moments for compensation by means of the respective counterweights 15', 16', 17' and 18', in a similar manner as hereinbefore described.

Industrial Utility

According to the first-order balancer of an internal combustion engine of the present invention, vertical and horizontal first-order unbalanced moments arising during the driving of a diesel engine may be simultaneously balanced to zero, by placing forward-rotational counterweights with a weight of W on both forward-rotating fly-wheels, placing backward-rotational counterweights with a weight of w on both backward-rotating fly-wheels, and providing gear-wheel mechanisms comprising forward-rotating gears, backward-rotating gears and level gears.

What we claim:

1. A first order balancer of an internal combustion engine including a crank shaft having first and second ends comprising:

first and second forward rotating flywheels respectively fitted on said first and second ends of said crank shaft and allowed to rotate in the same direction as said crank shaft;

first and second backward rotating flywheels respectively disposed outside of each of said first and second ends of said crank shaft and coaxially therewith;

first bevel gear mechanism disposed at said first end of said crank shaft between said first forward rotating flywheel and said first backward rotating flywheel, and second bevel gear mechanism disposed at said second end of said shaft between said second forward rotating flywheel and said second backward rotating flywheel, said first and second bevel gear mechanisms adapted to rotate said backward rotating flywheels in a direction opposite from a direction of said forward rotating flywheels;

first and second forward rotational counterweights disposed respectively on said first and second forward rotating flywheels; and first and second backward rotational counterweights respectively disposed on said first and second backward rotating flywheels said backward rotation counterweights having a different weight from said forward rotational counterweights.

* * * * *